United States Patent [19]
Schild

[11] 3,764,138
[45] Oct. 9, 1973

[54] SIMULATED FISHING GAME

[76] Inventor: Charles W. Schild, 8605 Ramble Rd., Wonder Lake, Ill. 60097

[22] Filed: Sept. 8, 1970

[21] Appl. No.: 36,122

[52] U.S. Cl. ............... 273/85 R, 273/110, 273/115
[51] Int. Cl. .............................................. A63f 7/16
[58] Field of Search ................. 273/1 R, 85 R, 109, 273/110, 113, 140, 115, 94

[56] References Cited
UNITED STATES PATENTS

| 3,606,330 | 9/1971 | Chapman | 273/94 R |
| 242,187 | 5/1881 | Bryan | 273/110 |
| 723,120 | 3/1903 | Adams | 273/109 |
| 1,319,245 | 10/1919 | Raster | 273/115 |
| 3,479,033 | 11/1969 | Crisafolli et al. | 273/110 X |
| 3,539,188 | 11/1970 | Salverda | 273/110 |

FOREIGN PATENTS OR APPLICATIONS

| 1,056,493 | 2/1952 | France | 273/110 |
| 1,311,080 | 10/1962 | France | 273/110 |

*Primary Examiner*—Anton O. Oechsle
*Assistant Examiner*—Paul E. Shapiro

[57] ABSTRACT

A tiltable surface having a number of openings therein is supported on a pivot post above an inclined surface. Adjacent the lower end of the inclined surface are a plurality of pockets each containing a fish tab. Enclosing the tiltable and inclined surfaces is a box having an oval opening in its top the opening overlying the tiltable surface. A fishing rod has a bobber on a line at one end which bobber rests on the tiltable surface and encloses a ball. The other end of the fishing pole is attached by a second line, extending through the box top, to the tiltable surface. Manipulation of the fishing line causes tilting of the tiltable surface with resultant movement of the bobber over the tiltable surface. When the bobber overlies one of the openings in the tiltable surface the ball falls through to the inclined surface and rolls therealong into one of the pockets dislodging a fish tab therefrom.

1 Claim, 21 Drawing Figures

PATENTED OCT 9 1973　　3,764,138

WITNESSES

INVENTOR
CHARLES W. SCHILD

ATTORNEY

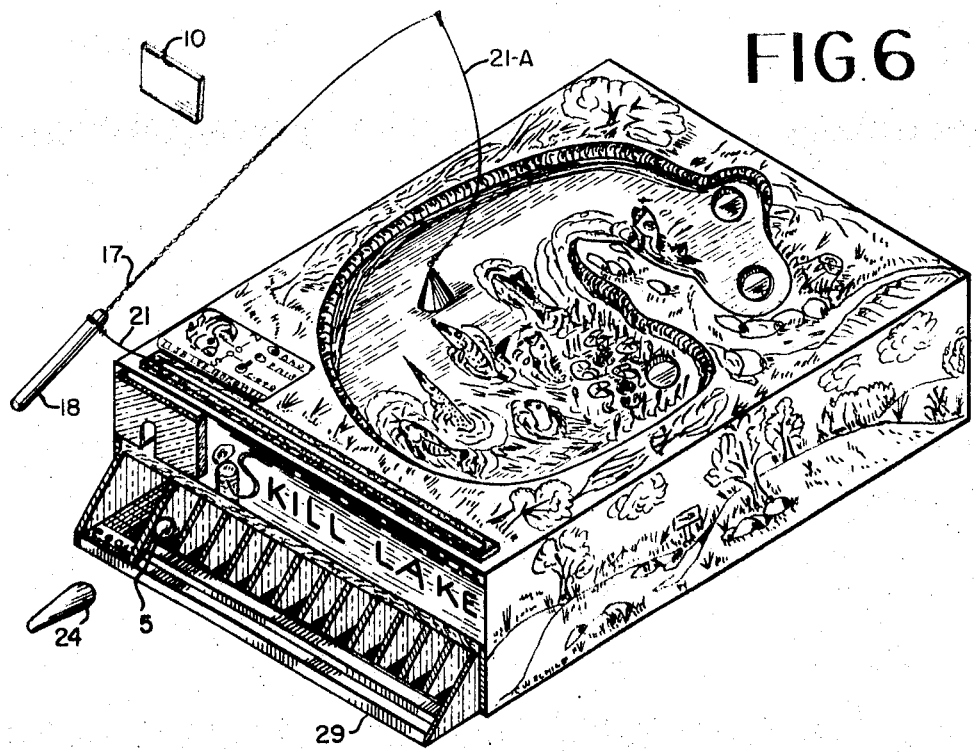
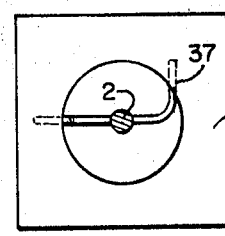
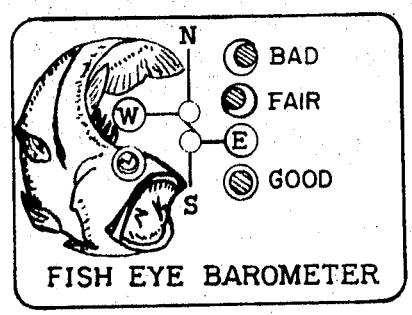
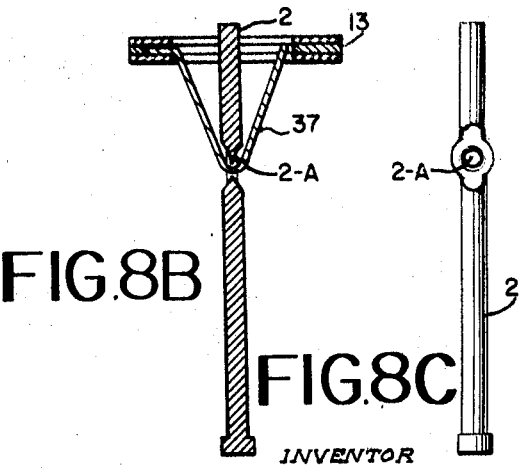

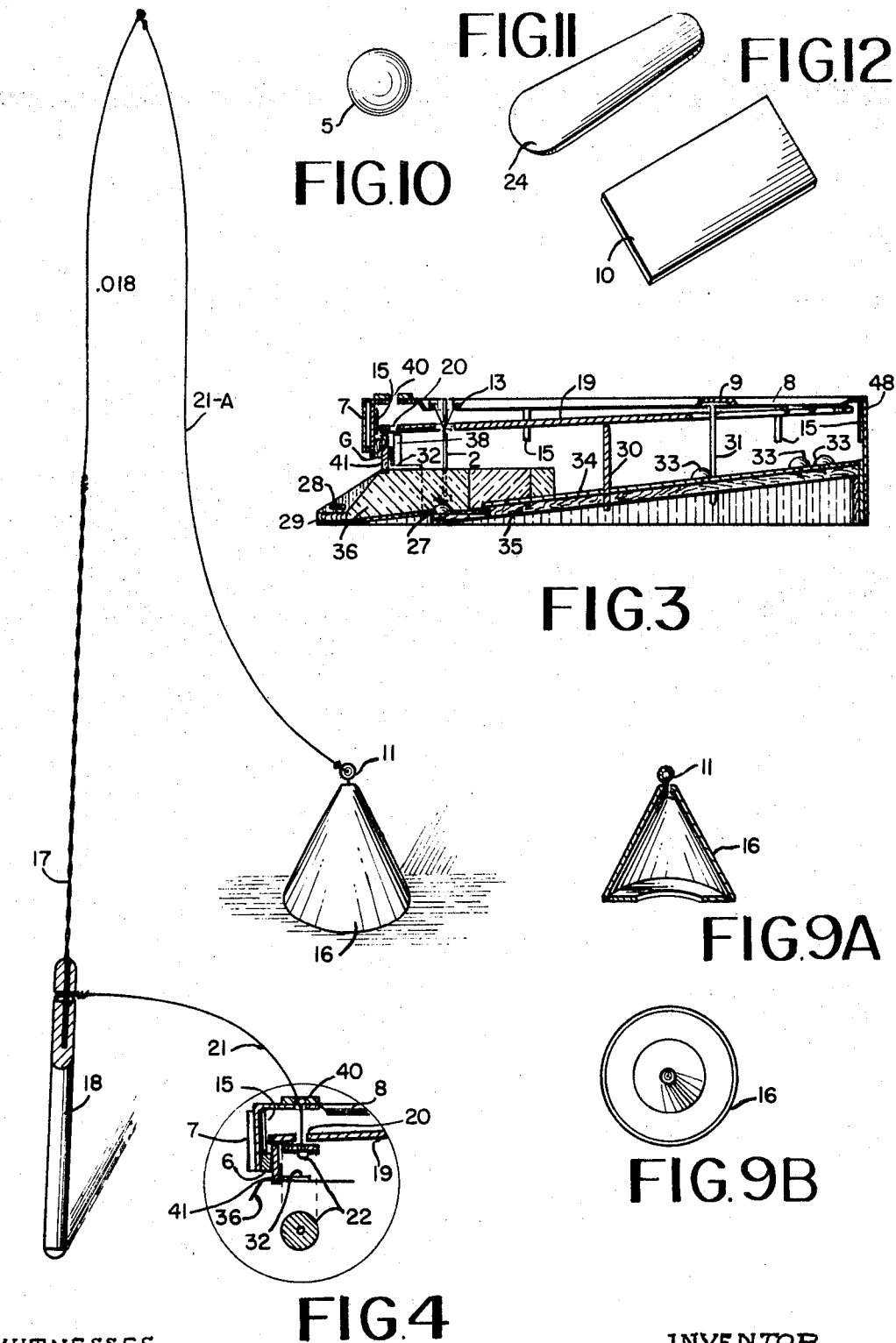

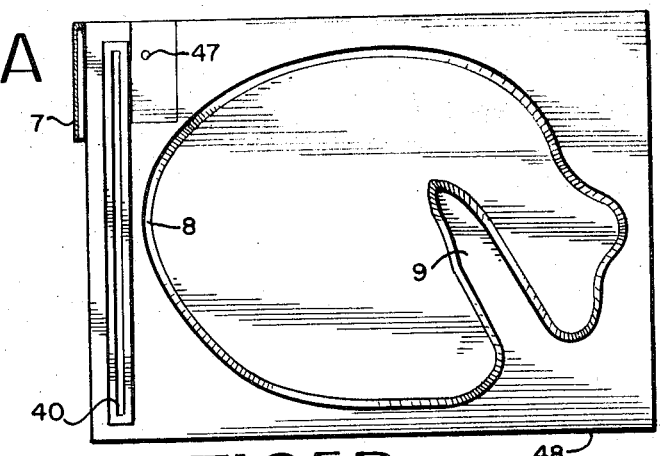
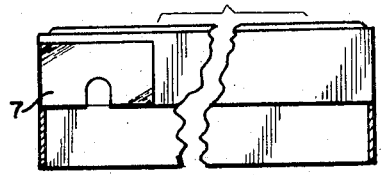
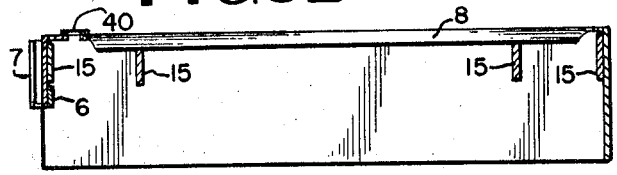
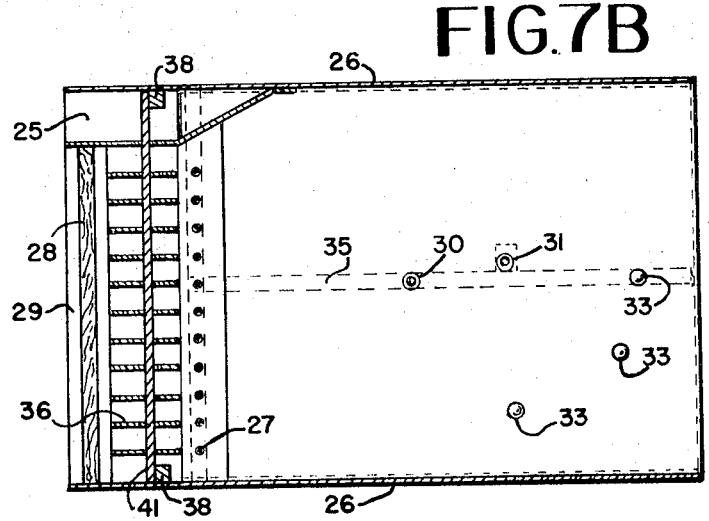
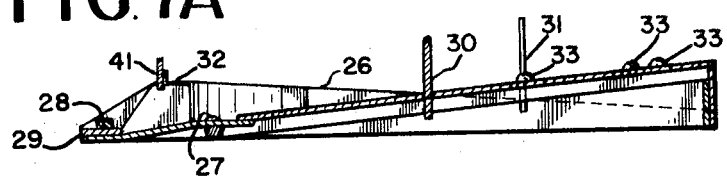

3,764,138

SIMULATED FISHING GAME

This invention relates to Skill-Lake as a fishing game and more particularly so because it taxes the skill of the players to keep the bobber on a steel ball, "referred to as bait"; while the bobber goes wildly about the lake in a floating manner until the ball disappears which means that a fish as been caught.

It is an object of the present invention to provide in a simple and efficient manner a surface which can be controlled by a fishing pole, to guide a floating bobber to one of three desired fishing holes in the lake, through which the steel ball will drop to a deflector hump on a sloping bottom having twelve fish pockets, a landing plate, and a fish pool.

Another object of the present invention is to provide a game that can be played by more than one player, by taking turns, and having a tournament feature to declare a winner.

Still a further object of the present invention is to provide a set of 10 tournament cards having the names of 10 fish to match those on the fish tabs, 24 at FIG. 5, of which there are 25, 12 of which are placed in the fish pockets and the rest go into the pool for replacements as the pockets are being emptied.

Still a further object of the present invention is to provide a game having all the characteristics of a real fishing adventure which can be produced, packaged, and sold in large quantities at a comparatively low cost and which can be conveniently utilized wherever needed.

Still additional objects, benefits, and advantages of this invention will become evident from a study of the following detailed description taken in conjunction with the accompanying drawing, in which:

FIG. 2 shows a plan view of the Fish Eye Barometer Chart.

FIG. 3 shows a sectional view through the assembled game device.

FIG. 4 shows a perspective view of the fishing pole and bobber with attachment detail.

FIG. 5A shows a plan view of the game housing.

FIG. 5B shows a side view, partly in section, of the game housing.

FIG. 5C shows an end view of the game housing.

FIG. 6 shows a perspective view of the assembled game device.

FIG. 7A shows a side view of the game base.

FIG. 7B shows a plan view of the game base.

FIG. 8A shows a plan view of the Fish Eye Barometer assembly.

FIG. 8B shows a side sectional view of the Fish Eye Barometer assembly.

FIG. 8C shows a side elevation of the Fish Eye Barometer pendulum.

FIG. 8D shows a plan view of the Fish Eye Barometer pendulum.

FIG. 9A shows a side sectional view of the bobber.

FIG. 9B shows a plan view of the bobber.

FIG. 10 shows the ball.

FIG. 11 shows a fish tab.

FIG. 12 shows a tournament card.

Figure 1A:
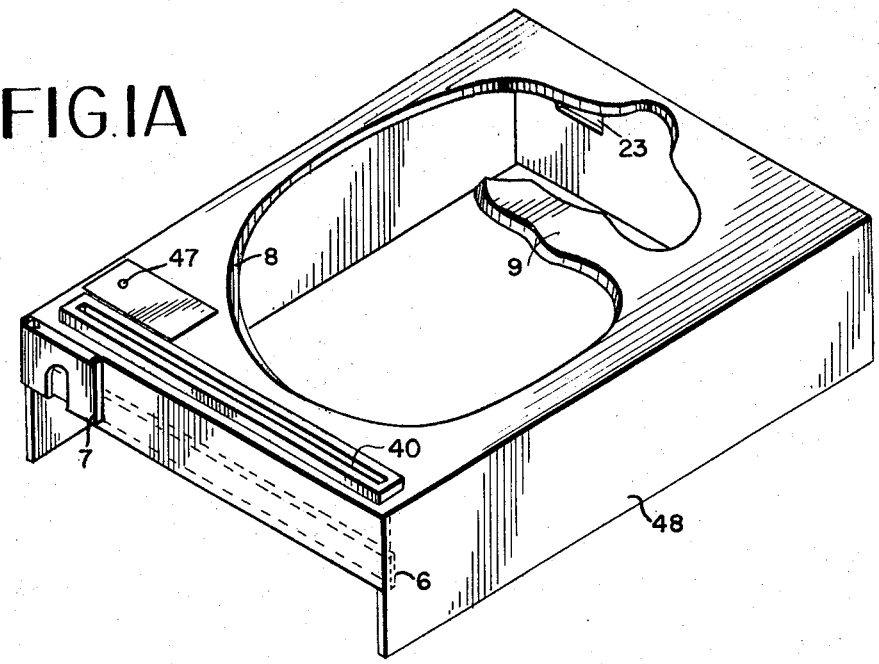
FIG. 1A shows a perspective view of the game housing.

Referring now specifically to the drawing, a Skill-Lake fishing game assembled from the structure shown in FIGS. 1, 2, 4, 5 and 7 in accordance with the present invention is shown to include an oblong shape box 48, having four sides and a lemon shape cut out top flared down to make a lake edge 8, and having a foot shape hazard 9, extending inward toward the opposite side.

Also on the top of said box 48 is a hole 47 being part of the Fisheye Barometer 13, FIG. 2, and a long narrow slot 40 with a small margin on each end, reinforced by one half round riser on each side of the slot.

And now going to the front end of said box 48 which goes only half way down and is reinforced by Strip 6, FIG. 1, which will overlap Support 41, is added a narrow box 7, having a finger hole, and designed to hold a tournament card 10.

A slot 23 at the opposite end of said box 48, being level with the top of the sloping bottom, is for removing trapped fish tabs 24.

Referring now specifically to the drawing, a Skill-Lake fishing game made in accordance with the present invention is shown to include as in FIG. 3, a floating lake 19, having a smooth plastic covered water and fish scene and sufficient thickness to prevent warping and having various holes, three of which 14, are large enough to allow a steel ball 5, to fall through on a rounded deflector hump 33, supported by a sloping bottom 34, and having another structure 35 indicated by dotted lines on the underside of the sloped bottom 34, supporting a vertical post 31, which is a support for hazard 9, FIG. 1 and said post 31 passing through hole 3 of lake 19, FIG. 3 and said hole being large enough so as not to interfere with the tilting action of the lake 19.

Also used is a second vertical post 30 and supported by the said structure 35 and having a round top on which lake 19 is held up and allowed to tilt to its maximum without losing the steel ball 5 between the lake top 19 and the lake edge 8, FIG. 1.

Figure 1B:
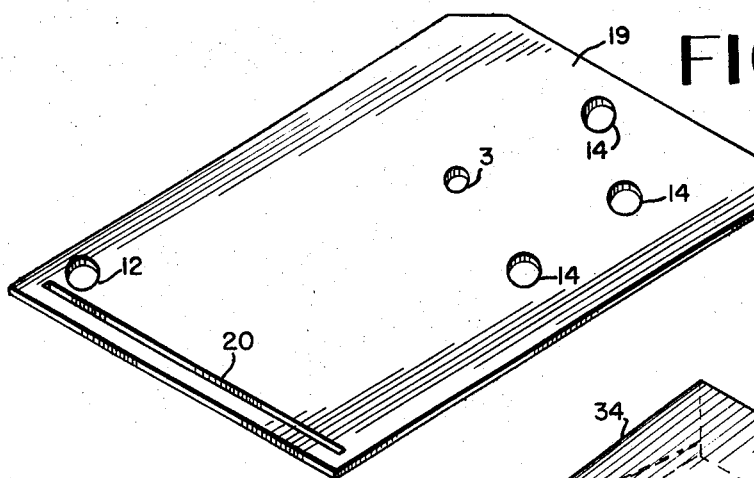
FIG. 1B shows a perspective view of the tilting game surface.

Referring now specifically to the drawing a Skill-Lake fishing game made in accordance with the present invention is shown to include a tilting lake 19, FIG. 3 free floating within its scope of movement, aided by guides 15 on the inside of box 48, FIG. 5B and said lake 19, FIG. 1B, having a long slot 20 at one end, cut to correspond and align with slot 40 of said box 48, FIG. 1, and also said lake 19 having a large hole 12 to clear the working parts of the Fisheye Barometer 13, FIG. 2, of which the top of Pendulum 2 will extend through and swing in the center of hole 47 in said box 48 of FIG. 1, where said pendulum will swing flush with the top.

Referring now specifically to the drawing a Skill-Lake fishing game made in accordance with the present invention is shown to include a sloping bottom 34, on which a steel ball 5, FIG. 10 will roll, first landing on a deflector hump 33, always sending the steel ball in a different direction down the slope through the fish pockets 36 to the landing plate 29, forcefully evacuating a fish tab from its pocket.

Figure 1C:
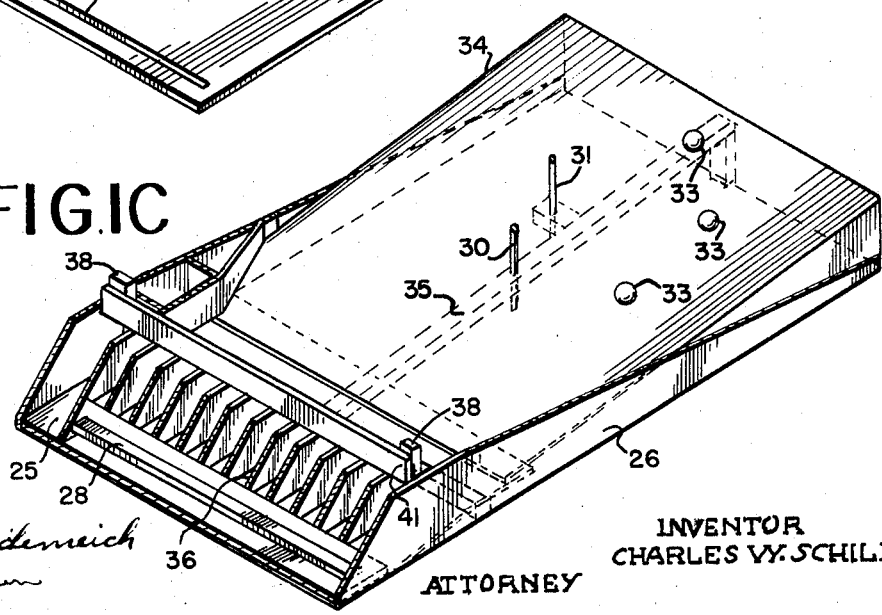
FIG. 1C shows a perspective view of the game base.

Referring now specifically to the drawing a Skill-Lake fishing game made in accordance with the present invention is shown to include a sloping bottom 34, FIG. 3 and a vertical post 30, held in a fixed position by structure 35 to come up in an off-center location under lake 19, FIG. 3, causing the lake 19 to be heavy at the slotted end where it comes to rest on two similar posts 38, FIGS. 1C and 3 being lower than post 30 to create a forward slope of the lake 19 and leaving a space between the underside of lake 19 and the top sloping surface of the bottom 34, on which the steel ball 5 will roll without binding at any point. Also included on the sloping bottom 34 of FIGS. 1C and 3 is a fish pool 25 which extends back of post 38 where it is blocked off by a triangular box to provide protection for the Fisheye Barometer 13, FIG. 2, Pendulum 2, to swing freely, and said triangle side to deflect the steel ball 5 to a fish pocket 36 of which there are twelve, divided by eleven separators which are held in position by a suitable support 41, "also supporting posts".

A protector strip 28 under which fish tabs 24 loosely slip, large end forward, partially extending into pockets 36 over a landing plate 29, which supports the protector strip 28 and the pocket assembly 36 all being secured to the sloping bottom 34 of FIGS. 1C and 3. A very important part of the landing plate is the height, which must be the plate plus the fish tab, to be half the diameter of the steel ball. Also included is a glider strip 32, over which a washer 22 of FIG. 4 glides, to keep said washer out of the fish pockets, and to further support the top of the separators which are further protected by eleven rounded deflector humps 27 to prevent ball stalling.

Also included and being part of the sloping bottom 34 are the added supports 26, one on each side, giving added strength to the landing plate 29 assembly and component parts thereof.

The operation of Skill-Lake will now be more readily understood by referring to the simple instructions.

Place game on a table, check the Fisheye Barometer. If the fishes eye ball swings freely in the center of the eye socket the game is level. Shuffle the ten cards. Do not look at the names. Put one in the tournament box. Do not remove until all fish have been taken from the pool.

Put one fish tab "large end forward" under the protector plate and loosely extending into each fish pocket. The remaining fish tabs go into the fish pool to replace each fish that you catch.

One or more fishermen may fish by taking turns and keep their catches separately, hoping to have a winner. "A steel ball is your bait." Place it on the lake and keep it covered at all times with the bobber, while holding the fish pole in your hand and moving along the slot to various positions. To get a nibble-raise and lower the fish pole handle. If the bobber comes off the ball you have lost your bait. If this happens to you three times, your turn goes to the next fisherman.

To catch a fish, lead the bobber to one of the fish holes. When the ball disappears, you have caught a fish.

Pick up your fish and replace it with one from the pool. Keep fishing until the pool is empty and everyone has had his turn. Now remove the card from the tournament box. If no winner appears, change the tournament card. Replace the missing fish in their pockets and put the rest back in the pool and continue to fish until the pool is empty again. Somewhere in this lake is a winner.

While this invention has been described with particular reference to the construction shown in the drawing and while various changes may be made in the detail construction, it shall be understood that such changes shall be within the spirit and scope of the present invention as defined by the appended claims.

I claim:

1. A simulated fishing game comprising:
    1. an inclined surface;
    2. a plurality of game piece catch pockets at the lower end of said inclined surface;
    3. a pivot post extending upwardly from generally the central area of said inclined surface;
    4. a simulated lake surface member pivotally supported on said pivot post and spaced from said inclined surface; (a) at least one opening arranged within said simulated lake surface member and, (b) a slot in said simulated lake surface member spaced generally outwardly of the central area thereof;
    5. a simulated fishing pole having; (a) a first line attached to and extending from said fishing pole and slidingly engaging the slot in said simulated lake surface member, (b) a second line attached to said fishing pole and ending in a simulated bobber adapted to engage the upper surface of said simulated lake surface member, said simulated bobber having a ball receiving recess in the underside thereof and;
    6. a ball sized to fit loosely in the recess of said bobber; through the opening in the simulated lake surface member; within the space between the simulated lake surface member and the inclined surface; and in the catch pockets, whereby manipulation of said fishing pole causes tilting movement of said simulated lake surface member so that the ball may be caused to roll over the lake surface member while confined within the bobber and through said at least one opening, to travel along said inclined surface into one of the catch pockets.

* * * * *